(12) United States Patent
Campbell et al.

(10) Patent No.: US 7,596,485 B2
(45) Date of Patent: Sep. 29, 2009

(54) MODULE FOR CREATING A LANGUAGE NEUTRAL SYNTAX REPRESENTATION USING A LANGUAGE PARTICULAR SYNTAX TREE

(75) Inventors: Richard G. Campbell, Redmond, WA (US); Eric K. Ringger, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/882,697

(22) Filed: Jun. 30, 2004

(65) Prior Publication Data
US 2006/0004563 A1  Jan. 5, 2006

(51) Int. Cl.
G06F 17/27 (2006.01)
G06F 17/20 (2006.01)

(52) U.S. Cl. ............................................. 704/9; 704/1
(58) Field of Classification Search ..................... 704/2, 704/4, 9
See application file for complete search history.

(56) References Cited

U.S. PATENT DOCUMENTS

| | | | | |
|---|---|---|---|---|
| 5,794,050 | A * | 8/1998 | Dahlgren et al. ............ | 717/144 |
| 6,112,168 | A * | 8/2000 | Corston et al. ................. | 704/9 |
| 6,243,670 | B1 * | 6/2001 | Bessho et al. .................. | 704/9 |
| 6,278,968 | B1 * | 8/2001 | Franz et al. ..................... | 704/3 |
| 6,778,949 | B2 * | 8/2004 | Duan et al. ...................... | 704/2 |

OTHER PUBLICATIONS

Marcus, "Building a Large Annotated Corpus of English: The Penn Treebank", 1993, ACL, p. 1-22.*
Campbell, "Language-Neutral Syntax: An Overview", Jul. 2002, Microsoft Research, p. 1-27.*
"Lexical-Functional Syntax". by Joan Bresnan / Blackwell Publishers / 2001.
"Converting Treebank Annotations to Language Neutral Syntax.", Richard Campbell and Eric Ringger, prior to Jun. 30, 2004.
"Translation by Quasi Logical Form transfer". Alshawi, H., D. Carter, M. Rayner and B. Gamback. 1991. *In Proceeding of ACL 29.* pp. 161-168.
Computation of modifier scope in NP by a language-neutral method. Campbell, R. 2002. *In Proceedings of Coling 2002*, Taipei.
"A language neutral representation of temporal information." Campbell, R., T. Aikawa, Z. Jian, C. Lozano, M. Melero and A. Wu. 2002. *In LREC Workshop Proceedings: Annotation Standards for Temporal Information in Natural Language.* pp. 13-21.

(Continued)

*Primary Examiner*—Richemond Dorvil
*Assistant Examiner*—Olujimi A Adesanya
(74) *Attorney, Agent, or Firm*—Westman, Champlin & Kelly, P.A.

(57) ABSTRACT

A method or module for creating an Language Neutral Syntax (LNS) representation of a sentence from a language particular syntax representation such as found in the Penn Treebank for use by different applications. The method or module includes a node generator configured to create hierarchical and dependent nodes using phrasal and constituent nodes of the language particular syntax. A node dependency generator is configured to create an unordered hierarchical dependency structure for the hierarchical and dependent nodes using a semantic relation between the hierarchical and dependent nodes derived from the language particular syntax.

17 Claims, 13 Drawing Sheets

OTHER PUBLICATIONS

"Language-neutral representation of syntactic structure" Campbell, R. and H. Suxuki. 2002. *In Scanalu 2002: Proceedings of the First International Workshop on Scalable Natural Language Understanding, Heidelberg.*

"Language Neutral Syntax: An overview" Campbell, R. and H. Suzuki. 2002. Technical Report MSR-TR-2002-76. Microsoft Research, Redmond, WA.

"A Maximum-Entropy-Inspired Parser." Charniak, E. 2000. *In Proceedings of NAACL 2000.*

"Automatic F-structure annotation of treebank trees." Frank. A. 2000. *In Proceedings of LFGOO Conference.*

"From TreeBank to PropBank." Kingsbury, P. and M. Palmer. 2002. *In Proceedings of the 3rd International Conference on Language resources and Evaluation (LREC 2002)*, 1974-1981. Las Palmas de Gran Canaria.

"Covering treebanks with GLARF." Meyers, A., R. Grishman, M. Kosaka, & S. Zhao. 2001. *In ACL/EACL Workshop on Sharing Tools for Research and Education.*

"Achieving commercial-quality translation with example-based methods.", Rechardson S., W. Dolan, A. Menezes and J. Pinkham. 2001. *In Proceedings of the VIIIthe MT summit.* pp. 293-298.

"Developing guidelines and ensuring consistency for Chinese text annotation." xia, F., M. Palmer, N. Xue, M.E. Okurowski, J. Kovarik, F.-D. Chiou, S. Huang, A. Kroch, and M. Marcus. 2000. *In Proceedings of the 2nd International Conference on Language Resources and Evaluation (LREC 200)*, Athens.

"Synonymous collocation extraction using translation information." Wu, Hua and Ming Zhou. 2003. *In Proceedings of ACL 41.*

"Intelligent writing assistance." Heidorn, G. 2000. In R. Dale, H. Moisl, and H. Somers, eds., *Handbook of Natural Language Processing*, Marcel Dekker.

\* cited by examiner (NPSubj(NP(NN(NONE))(PP(IN(OF))(NP(DT(the))(JJS(largest))(JJ(America))(NNS(COMPANIES)))))) -
(VP((VBP(ARE)))(VP((VBG(BEING))(VP(VBN(audited))(NP(NONE))(ADVP-TMP(RE(yet)))))))

MODULE FOR CREATING A LANGUAGE NEUTRAL SYNTAX REPRESENTATION USING A LANGUAGE PARTICULAR SYNTAX TREE

BACKGROUND OF THE INVENTION

The present invention relates to a method or module for language neutral syntax representations. More particularly, the present invention relates to an application for creating a language neutral representation using a language particular syntax representation.

A wide variety of applications would find it beneficial to accept inputs in natural language. For example, if machine translation systems, information retrieval systems, command and control systems (to name a few) could receive natural language inputs from a user, this would be highly beneficial to the user.

In the past, this has been attempted by first performing a surface-based syntactical analysis on the natural language input to obtain a syntactic analysis of the input. Of course, the surface syntactic analysis is particular to the individual language in which the user input is expressed, since languages vary widely in constituent order, morphosyntax, etc.

Thus, the surface syntactic analysis was conventionally subjected to further processing to obtain some type of semantic of quasi-semantic representation of the natural language input. Some examples of such semantic representations include the Quasi Logical Form in Alashawi et al., TRANSLATION BY QUASI LOGICAL FORM TRANSFER, Proceedings of ACL 29:161-168 (1991); the Underspecified Discourse Representation Structures set out in Reyle, DEALING WITH AMBIGUITIES BY UNDER SPECIFICATION: CONSTRUCTION, REPRESENTATION AND DEDUCTION, Journal of Semantics 10:123-179 (1993); the Language for Underspecified Discourse Representations set out in Bos, PREDICATE LOGIC UNPLUGGED, Proceedings of the Tenth Amsterdam Colloquium, University of Amsterdam (1995); and the Minimal Recursion Semantics set out in Copestake et al., TRANSLATION USING MINIMAL RECURSION SEMANTICS, Proceedings of TMI-95 (1995), and Copestake et al., MINIMAL RECURSION SEMANTICS: AN INTRODUCTION, MS., Stanford University (1999).

While such semantic representations can be useful, it is often difficult, in practice, and unnecessary for many applications, to have a fully articulated logical or semantic representation. For example, in a machine translation system, all that is required to translate the phrases into the French equivalents "chat noir" which is literally translated as "cat black" and "probléme legal" which is literally translated as "problem legal" is that the adjective modifies the noun in some way.

A language neutral syntax (LNS) representation provides a semantically motivated generally more neutral syntactical natural representation from which an application-specific representation can be derived. Predicate-argument structures derived from LNS are used as the transfer representation in the MSR-MT system. Other applications make use of other representations derived from LNS. These include extractions of bilingual collections, multi-document summarizations, automatic quiz generation, sentence classification and document classification. Presently, derivation of the LNS representation is limited to a NLPWin parser.

SUMMARY OF THE INVENTION

The present invention provides a LNS from a language particular syntax representation such as is found in the Penn Treebank which has advantages for producing LNS and predicate-argument structures derived therefrom for use by different applications. A node generator is configured to create hierarchical and dependent nodes of the LNS using phrasal and constituent nodes of the language particular syntax. A node dependency generator is configured to create an unordered hierarchical dependency structure for the hierarchical and dependent nodes of the LNS using a semantic relation between the hierarchical and dependent nodes derived from the language particular syntax.

In illustrated embodiments, the node generator uses a morphological analysis using part-of-speech tags of the language particular syntactical tree to derive leaf-nodes in the language neutral representation. The original form of the word or constituent such as tense, plural or other features is preserved by attribute notations of a nonterminal node.

In the illustrated embodiments, hierarchical and dependent nodes of the LNS representation and dependency structure therefor are derived based upon a head analysis of the language particular representation. The head analysis is used to create a head node for each terminal or constituent node of the language particular syntactical representation having a corresponding LNS node. The head nodes are used to generate a hierarchical dependency structure to represent logical scope and grammatical function of the constituents of the sentence.

BRIEF DESCRIPTION OF THE DRAWINGS

FIG. 5-1 illustrates a module or system for creating a language neutral syntactical representation using a language particular syntax tree or representation.

FIG. 6 illustrates an embodiment of a bracketed data string for a language particular syntax tree.

FIGS. 9-1 through 9-4 progressively illustrate an iterative process for creating a hierarchical nodal structure for the LNS representation using the language particular syntax tree.

DETAILED DESCRIPTION OF ILLUSTRATIVE EMBODIMENTS

The present invention relates a conversion for a surface syntactic tree or representation to a language neutral syntax representation of natural language. However, prior to describing the present invention in greater detail, one environment in which the present invention can be used will now be described.

Computer System Environment

Figure 1:
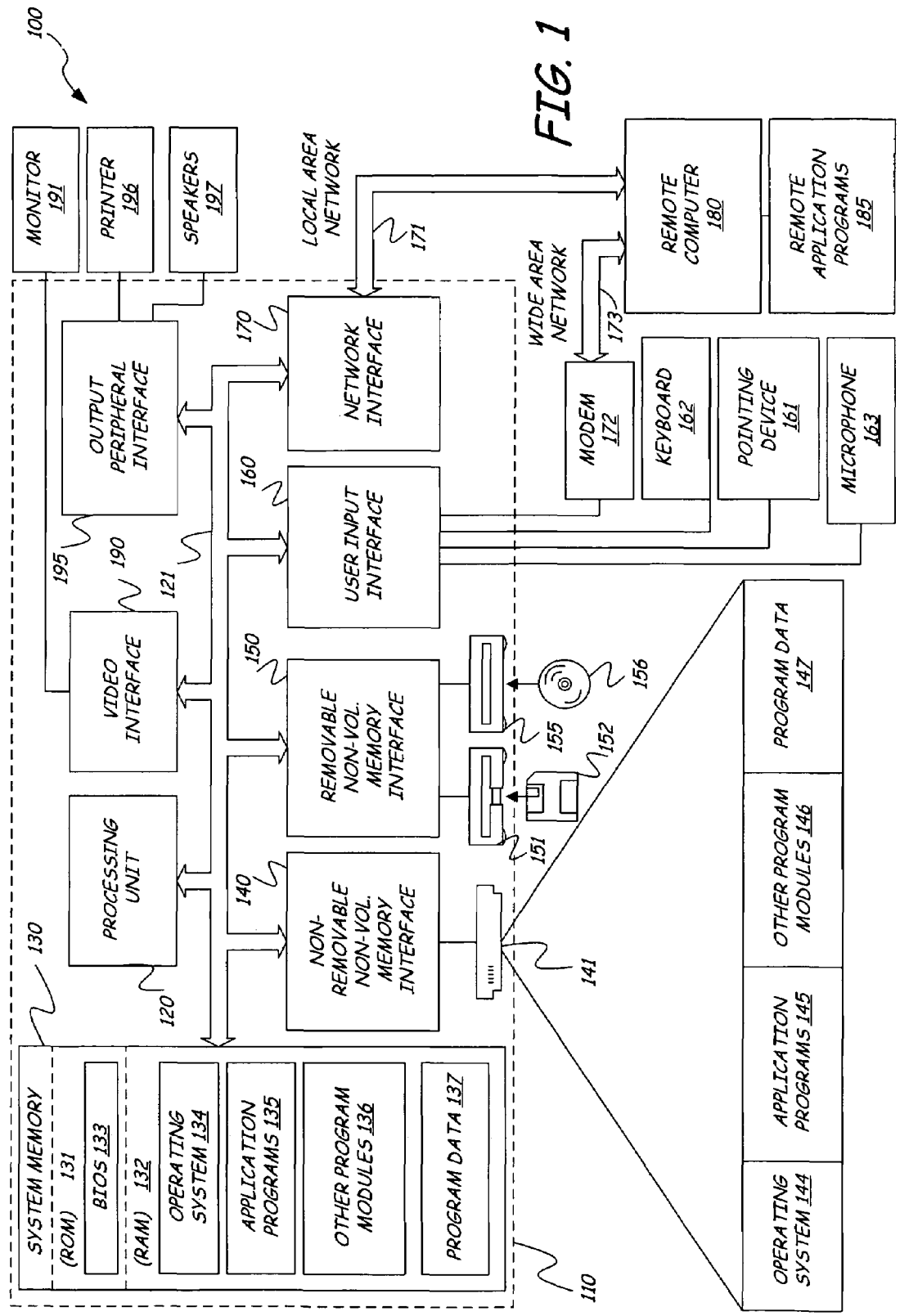
FIG. 1 is a block diagram of one illustrative embodiment of a computer in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement aspects of the present invention as instructions stored on computer readable media based on the description and figures provided herein.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Language Particular Syntax

Figure 2:
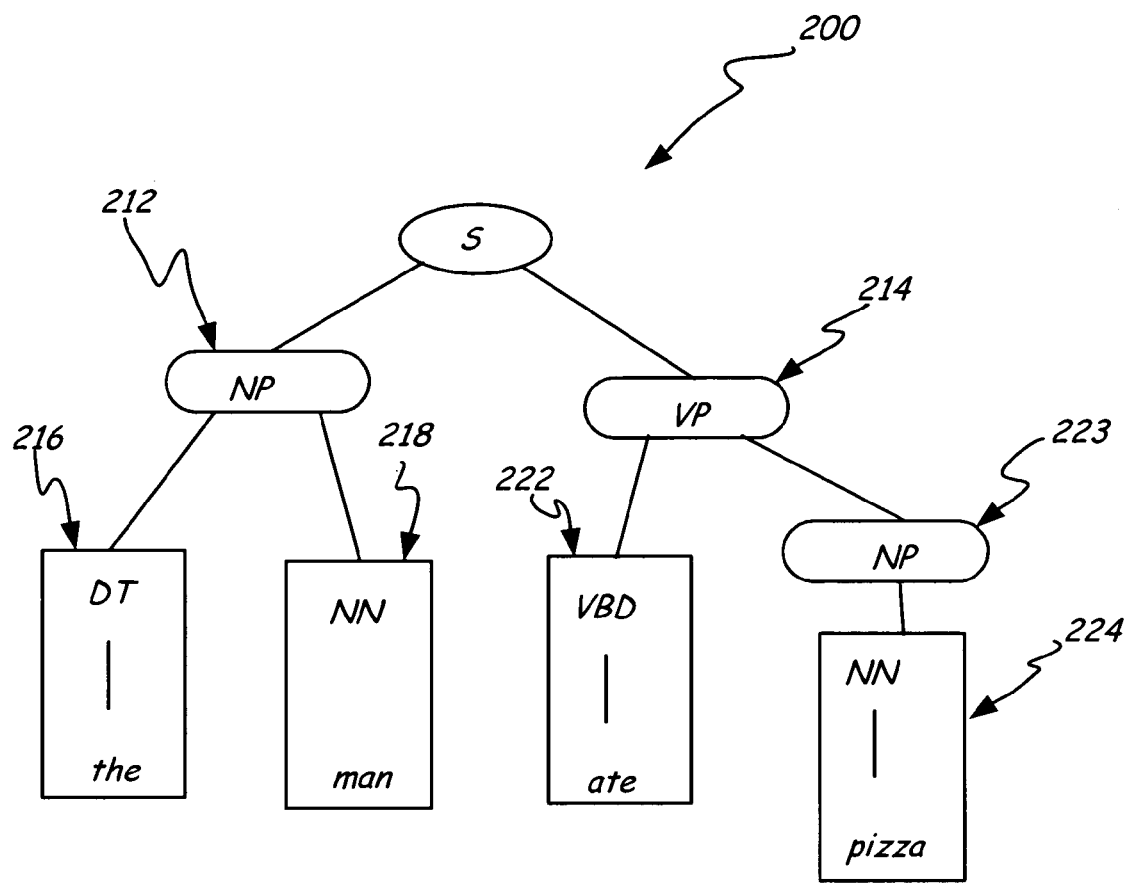
FIG. 2 is a schematic illustration of a language particular syntax tree for the sentence "The man ate pizza".

The present invention relates to a processing application or conversion for creating a language neutral representation (LNS) for a sentence annotated in a language particular syntax tree 200, such as a Penn Treebank (PTB) annotation as illustrated in FIG. 2. In particular, known parsers produce language particular syntax trees using well-known surface syntax analysis. The syntax tree 200 is a language particular representation of natural language words and phrases which includes grammatical tags or parts of speech labels and a language particular constituent structure. FIG. 2 illustrates a language particular syntax tree 200 or representation for the sentence (S) "The Man ate pizza". The sentence is parsed to represent that the sentence includes a noun phrase followed by a verb phrase represented by phrasal nodes (NP) 212 and (VP) 214. It also indicates that the phrasal node (NP) 212 is made up of a determiner (DT) 216 "the" followed by a common noun (NN) 218 which is the word "man". Further the phrasal node (VP) 214 is made up of the past tense verb (VBD) 222 "ate" and another noun phrase, (NP) 223, consisting of a common noun (NNN) 224 which is the word "pizza". The words "the". "man", "ate" and "pizza" represent terminal nodes of the language particular structure and include grammatical tags (DT—determiner), (NN—common noun), (VBD—past tense verb), (NN—common noun) respectively.

The language particular syntax tree 200 provides a constituent representation for the sentence, for example, it shows that the phrasal node (NP) 212 includes the words "the man" and the phrasal node (VP) 214 includes the words "ate pizza" which form phrasal constituents of the sentence. The language particular syntax tree 200 illustrated in FIG. 2 provides a language particular constituency structure, but does not necessarily provide a language neutral representation of morphology or grammatical function for adaptability for different applications and languages.

Figure 3:
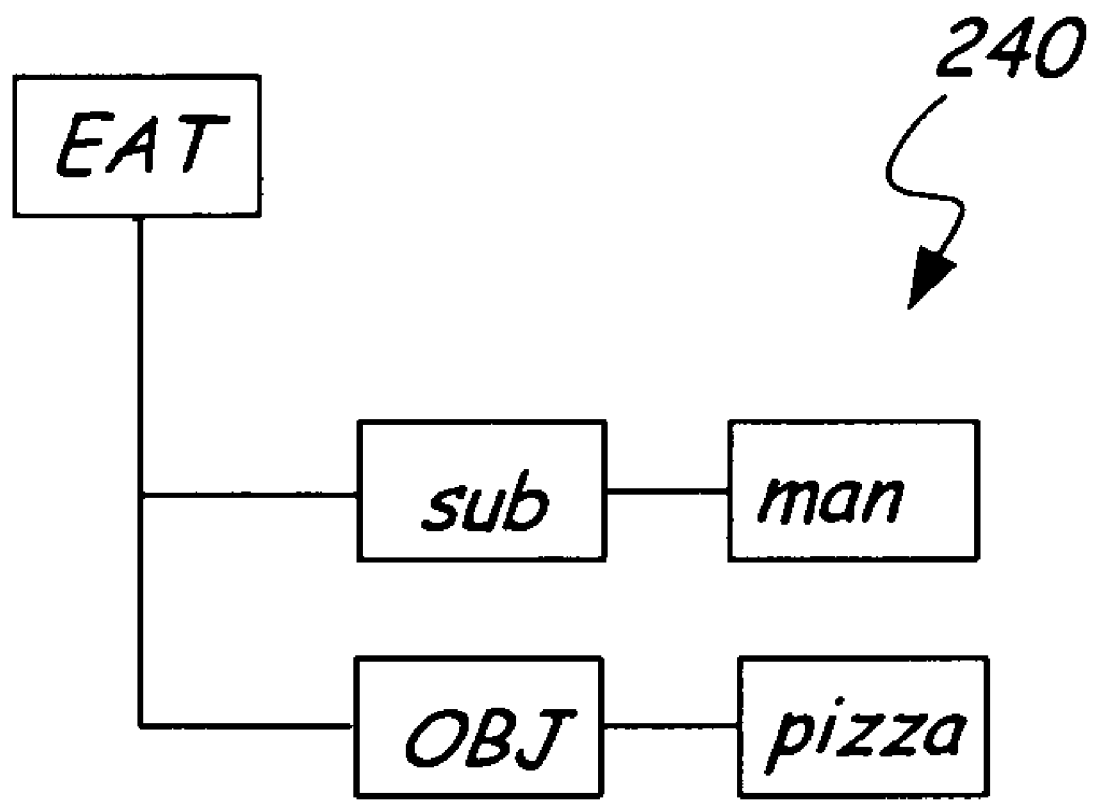
FIG. 3 is an illustration of an embodiment of a semantic representation for the sentence "The man ate pizza".

FIG. 3 illustrates a semantic representation 240 for the sentence "The man ate pizza" in which grammatical function or morphology are semantically represented. The semantic representation 240 grammatically relates the head word "eat" of the sentence to the other words "ate" and "pizza" in the sentence based upon grammatical function and relation (i.e. subject (SUB) or object (OBJ)). The dependency structure of the semantic representation 240 tells nothing about the constituency structure of the words or phrases.

Conventionally, the semantic dependency structure 240 is derived from a syntactical analysis and is language neutral and abstract enough for use by different applications. However in contrast to the language particular syntax representation 200 as illustrated in FIG. 2, information or content of the natural language representation is lost in the semantic representation 240.

Language Neutral Syntax Representation

Figure 4:
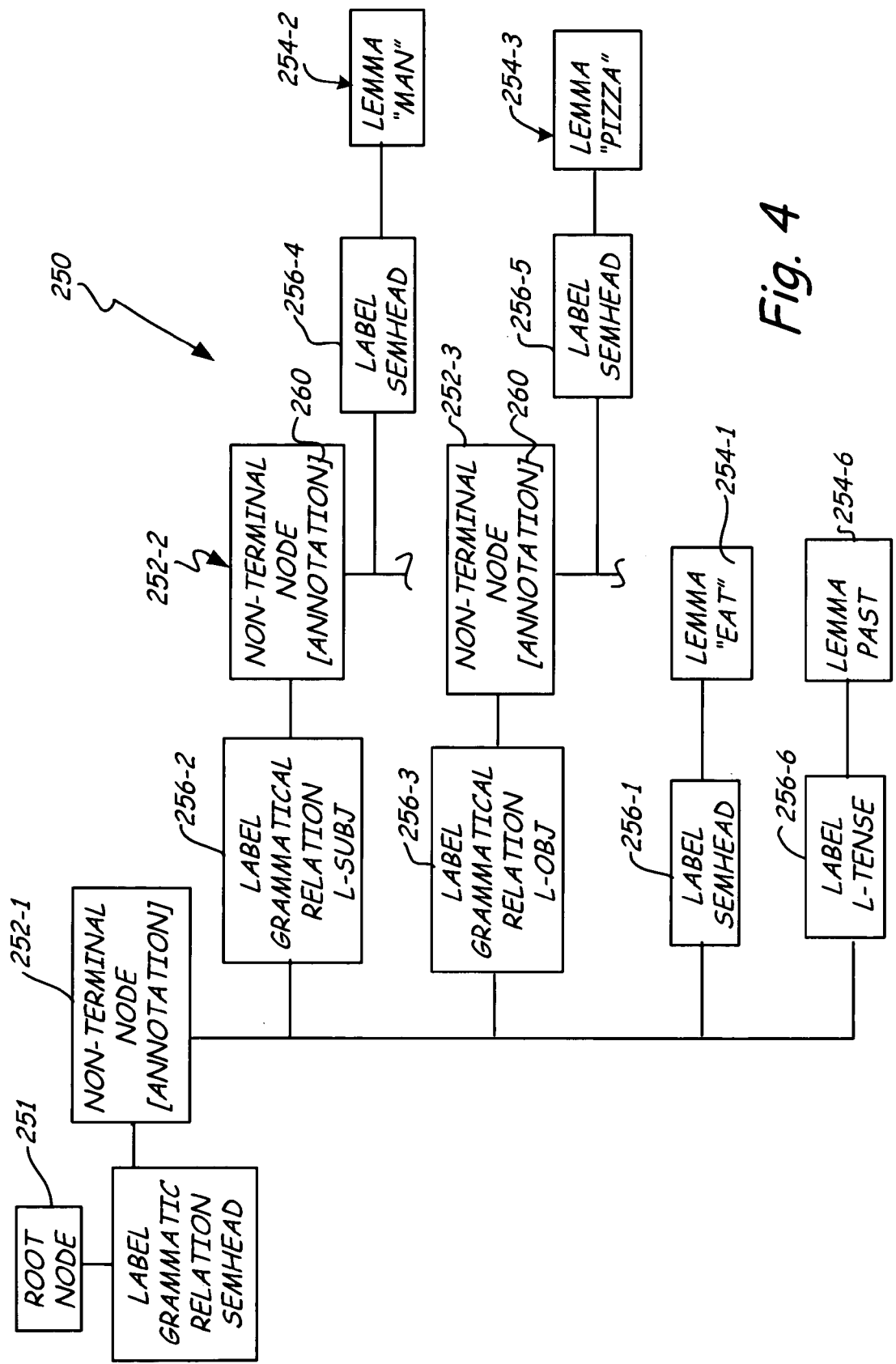
FIG. 4 is a block diagram illustrating an embodiment of a language neutral syntax representation.

FIG. 4 illustrates an embodiment of a language neutral syntax (LNS) representation 250 for the sentence "The man ate pizza". The LNS representation 250 is generally semantically motivated and represents the logical arrangement or relation of constituents or words of a sentence. LNS represents word order, grammatical function and inflection morphology in a language neutral format which is less dependent on the particulars of English or language specific surface syntax in contrast to the language particular syntax tree 200. The LNS representation 250 is more reflective of the logical relations of the words or constituents which is more constant from one language to another.

LNS 250 can be considered an intermediate between a language particular syntax tree 200 and a complete semantic analysis 240 and provides a semantically motivated substantially language neutral syntactical representation which can be used as an input to many different applications or can be readily adaptable to varied applications in contrast to the language particular syntax tree 200 illustrated in FIG. 2.

Generally, as shown in FIG. 4, the LNS representation 250 includes a root node 251, non-terminal nodes 252, which correspond generally to phrasal nodes 212, 214 (NP, VP) of the language particular syntax tree 200 and terminal nodes 254 which correspond generally to terminal nodes or constituent elements of the syntax tree 200. The non-terminal and terminal nodes 252, 254 are arranged in an unordered hierarchical structure to represent grammatical relations and logical scope of the sentence constituents or linguistic elements. The unordered hierarchical structure is semantically motivated and language independent.

Grammatical relationships between nodes 252, 254 of the hierarchical structure are represented by labeled arcs 256 connecting dependent nodes to a parent node. The arcs 256 are labeled with a relationship label such as L_Sub (Logical subject) or SemHeads (Semantic Head) to express grammatical function or logical relation. The hierarchical or dependency structure includes a head node for each terminal node of the LNS representation as will be described to provide a functional or logical relation for each of the constituent elements or words of the sentence or phrase.

Table I below illustrates example embodiments of semantic or grammatical function labels used to label arcs 256 between nodes 252, 254 in the unordered hierarchical tree structure (also referred to as "tree attributes").

TABLE I

Basic tree attributes: note that if x == attr(y), then y is x's parent

| Attribute | Usage | Examples |
|---|---|---|
| L_Sub | "logical subject": agent, actor, cause or other underlying subject relation; not e.g. subject of passive, raising, or unaccusative predicate; also used for subject of predication | She took it; John ran; It was done by me; you are tall. |
| L_Ind | "logical indirect object": goal, recipient, benefactive | I gave it to her; I was given a book |
| L_Obj | "logical (direct) object": theme, patient, including e.g. subject of unaccusative; also object of preposition | She took it; The window broke; He was seen by everyone |
| L_Pred | "logical predicate": secondary predicate, e.g. resultative or depictative | We painted the barn red; I saw them naked |
| L_Loc | Location | I saw him there |
| L_Time | time when | He left before I did; He left at noon |
| L_Dur | Duration | I slept for six hours |
| L_Caus | Cause or reason | I slept because I was tired; She left because of me |
| L_Poss | Possessor | my book; some friends of his |
| L_Quant | Quantifier/determiner | Three books; every woman; all of them; the other people |
| L_Mods | Otherwise unresolved modifier | I left quickly |
| L_Crd | Conjunction in coordinate structure | John and Mary |
| L_Interlocs | Interlocutor(s), addressee(s) | John, come here! |
| L_Appostn | Appositive | John, my friend, left |
| L_Purp | Purpose clause | I left to go home; His wife drove so that he could sleep; I bought it in order to please you |
| L_Intns | Intensifier | He was very angry. |

TABLE I-continued

Basic tree attributes: note that if x == attr(y), then y is x's parent

| Attribute | Usage | Examples |
|---|---|---|
| L_Attrib | Attributive modifier (adjective, relative clause, or similar function) | The green house; the woman that I met. |
| L_Means | Means by which | He covered up by humming. |
| L_Class | Classifier; often this is the grammatical head but not the logical head | a box of crackers |
| OpDomain | Scope domain of a sentential operator | He did not leave |
| ModalDomain | Scope domain of a modal verb/particle | I must leave. |
| SemHeads | Logical function: head or sentential operator | He did not leave; my good friend; He left. |
| Ptcl | Particle forming a phrasal verb | He gave up his rights |
| L_Degr | Degree Modifier | More information |
| L_Cond | Conditional subordinate clause | If that is what he wants, then he shall get it. |
| L_Interj | Interjection | |
| L_Tense | Language-neutral tense | |

As previously discussed, the words or constituent elements of the LNS are represented by terminal nodes 254. The terminal nodes 254 include a lemmatized form of the word or constituent element. Morphology of the word or constituent element such as case, gender, number, person, mood, or voice is represented by a nodal attribute fields or data strings 260 in a nonterminal node corresponding to the terminal node 254. This provides a language neutral representation where morphology of constituent elements or words is represented in a language neutral format. As described, the language neutral representation includes attribute features 260 to retain information regarding the original morphology in contrast to previous semantic representations. Table II represents example attribute features 260 represented in LNS.

TABLE II

Basic LNS features

| Feature name | Usage | Examples |
|---|---|---|
| Proposition | [+Proposition] identifies a node to be interpreted as having a truth value; declarative statement, whether direct or indirect | I left; I think he left; I believe him to have left; I consider him smart; NOT E.G. I saw him leave; the city's destruction amazed me |
| YNQ | Identifies a node that denotes a yes/no question, direct or indirect | Did he leave?; I wonder whether he left |
| WhQ | Identifies a node that denotes a wh-question, direct or indirect; marks the scope of a wh-phrase in such a question | Who left?; I wonder who left |
| Imper | Imperative | Leave now! |
| Def | Definite | The plumber is here |
| Sing | Singular | dog; mouse |

TABLE II-continued

Basic LNS features

| Feature name | Usage | Examples |
|---|---|---|
| Plur | Plural | dogs; mice |
| Pass | Passive | she was seen |
| ExstQuant | Indicates that a quantifier or conjunction has existential force, regardless of the lexical value; e.g. in negative sentence with negative or negative-polarity quantifiers; not used with existential quantifiers that regularly have existential force (e.g. some). | We (don't) need no badges; We don't need any badges |
| Reflex | Reflexive pronoun | He admired himself |
| ReflexSens | Reflexive sense of a verb distinct from non-reflexive senses | He acquitted himself well |
| Cleft | Kernel (presupposed part) of a (pseudo)cleft sentence | It was her that I met; who I really want to meet is John |
| Comp | Comparative adjective or adverb | |
| Supr | Superlative adjective or adverb | |
| NegComp | Negative comparative | less well |
| NegSupr | Negative superlative | least well |
| PosComp | Positive comparative | Better |
| PosSupr | Positive superlative | Best |
| AsComp | Equative comparative | as good as |

The LNS tree structure 250 can also have non-tree attributes which are annotations of the tree, but per se are not part of the tree itself, and indicate a relationship between nodes in the tree. An exemplary set of basic non-tree attributes is set out in Table III below.

TABLE III

Basic non-tree attributes

| Attribute | Type of value | Usage | Attribute of |
|---|---|---|---|
| Cntrlr | Single node | Controller or binder of dependent element | Dependent item |
| L_Top | List of nodes | Logical topic | clause |
| L_Foc | List of nodes | Focus, e.g. of pseudo(cleft) | Clause |
| PrpObj | Single node | Object of pre/postposition (often also L_Obj; see Table I) | node headed by pre/postposition |
| Nodename | String | Unique name/label of an LNS node; the value of Nodename is the value of Pred (for terminal nodes) or Nodetype (for nonterminal nodes) followed by an integer unique among all the nodes with that Pred or Nodetype. | all nodes |
| Nodetype | String | FORMULA or NOMINAL or null; all and only nonterminal nodes have a Nodetype | all non-terminal nodes |
| Pred | String | For terminal nodes, Pred is the lemma | Terminal nodes |
| MaxProj | Single node | Maximal projection; every node, whether terminal or nonterminal, should have one | all nodes |

TABLE III-continued

Basic non-tree attributes

| Attribute | Type of value | Usage | Attribute of |
|---|---|---|---|
| Refs | List of nodes | List of possible antecedents for pronominals and similar nodes | Anaphoric expression |
| Cat | String | Part of speech | Terminal nodes |
| SentPunc | List of strings | Sentence-level punctuation | root sentence |

In the illustrated embodiment, the LNS representation 250 for the sentence the "The man ate pizza" includes terminal nodes 254-1, 254-2, 254-3 corresponding to "man", "ate" (the lemma being "eat") and "pizza". The terminal nodes 254-1, 254-2, 254-3 are connected to non-terminal nonterminal nodes 252-1, 252-2, 252-3 through labeled arcs 256-1, 256-2, 256-3, respectively. As previously explained each terminal node 254-1, 254-2, 254-3 has a corresponding head node. In the illustrated embodiment the words, "man" and "pizza" of terminal nodes 254-2, 254-3 correspond to hierarchical or head nodes 252-2, 252-3 by semantic head (SemHead) labeled arcs 256-4, 256-6 and "eat" of terminal node 254-1 corresponds to head or nonterminal node 252-1 by the labeled arcs 256-1.

As previously described, grammatical function and scope is illustrated by the hierarchical relation between terminal nodes 254-1, 254-2, and 254-3 and nonterminal nodes 252-1, 252-2, 252-3 therefor. Hierarchical or head nodes 252-2, 252-3 corresponding to terminal nodes 254-2, 254-3 are connected or linked to nonterminal node 252-1 by grammatical relation relative to the semantic head "eat" of the nonterminal node 254-1. For example in the illustrated embodiment, nonterminal node 252-2 for terminal node 254-2 is linked to nonterminal node 252-1 as a logical subject (L_Sub) and nonterminal node 252-3 for terminal node 254-3 is linked to nonterminal node 252-1 as a logical object (L_Obj) of node 252-1 corresponding to the word "eat", respectively.

As previously described, words or constituent elements of the terminal nodes include a base or lemma of the word and inflectional morphology of the constituent element or word is represented by the attribute fields or strings 260 on a nonterminal node. As shown in the illustrated example, terminal node 254-1 includes the lemmatized form of the word "ate" or "eat" and the past tense is indicated by the presence of a tense node _PAST 254-6 in the L_Tense 256-6 relation to the sentence node.

Thus, LNS 250 represents logical order, morphology and grammatical function in a language neutral way using a labeled unordered hierarchical dependency structure which represents grammatical function and logical relations independent of language particular aspects such as word order. Voice, tense and aspect information is represented using nodal annotations or attributes 260 to provide a language neutral representation.

Application for Creating a LNS Using a Language Particular Syntax

Figure 5:
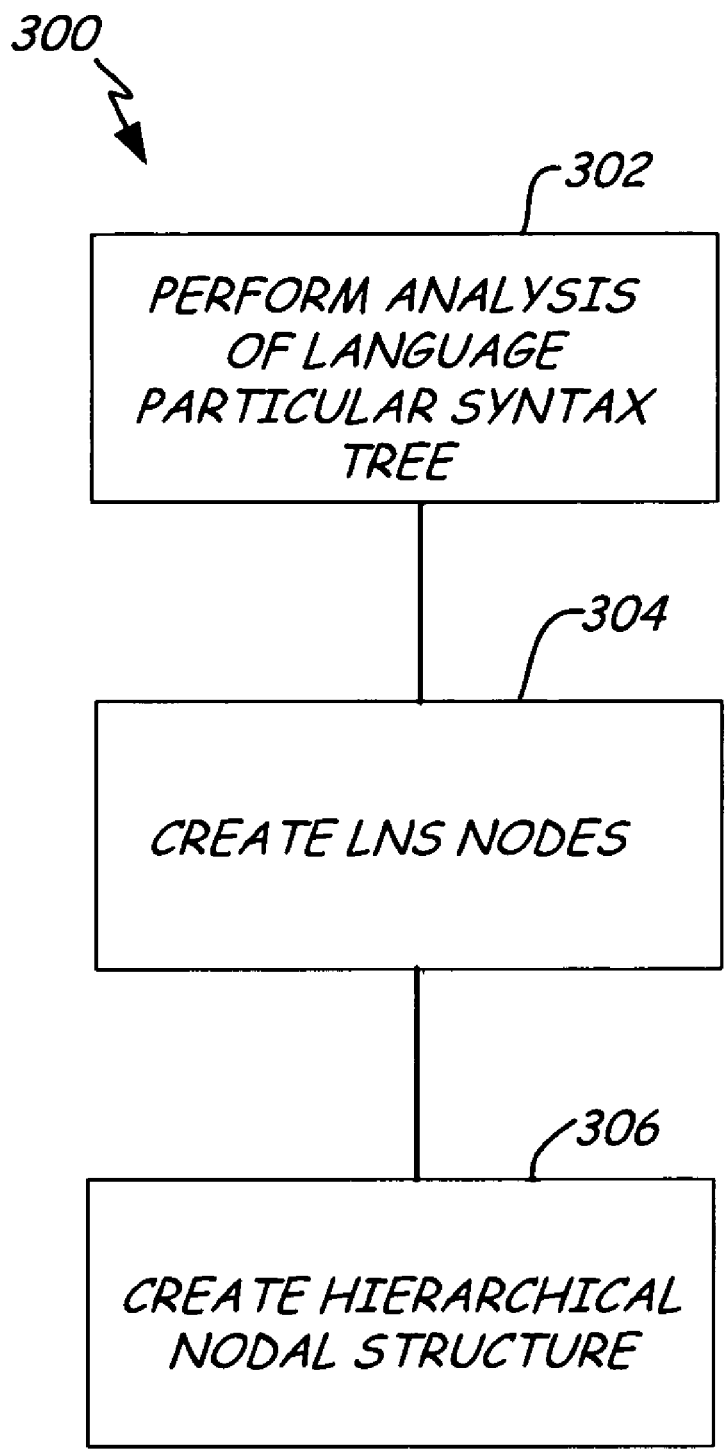
FIG. 5 is a block diagram illustrating an embodiment for creating or deriving an LNS representation from a language particular syntax tree.
Figures 1, 5:
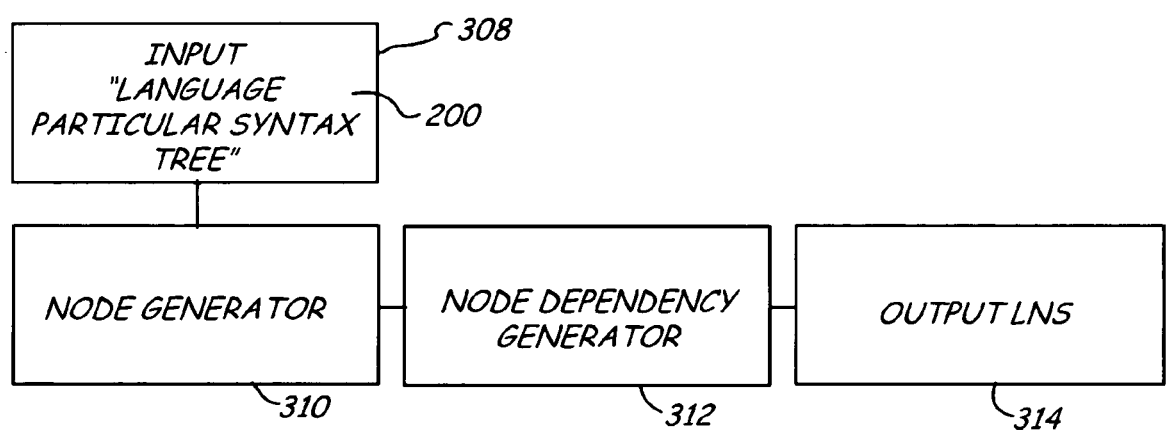

The present invention relates to a method or module for creating an LNS using a language particular syntax 200, such as for example, a Penn Treebank annotation as generally illustrated in FIG. 2. FIG. 5 illustrates method or module 300 to create the LNS representation 250 using a language particular syntax tree 200. In the illustrated embodiment of FIG. 5, the method or module 300 performs an analysis of the language particular syntax tree 200 as illustrated by block 302. Based upon this analysis, the method or module 300 creates LNS nodes and a hierarchical nodal dependency structure based on the language particular syntax tree 200 as illustrated by blocks 304 and 306.

As illustrated in FIG. 5-1, the system or module 300 receives an input language particular syntax as illustrated by block 308. A node generator 310 and a node dependency generator 312 create LNS nodes and a hierarchical dependency structure to output a language neutral syntax representation as illustrated by block 314. The LNS nodes and hierarchical dependency structure for the LNS nodes is created using terminal and phrasal nodes, grammatical tags, and syntactical order of the language particular syntax tree 200.

Figure 7:
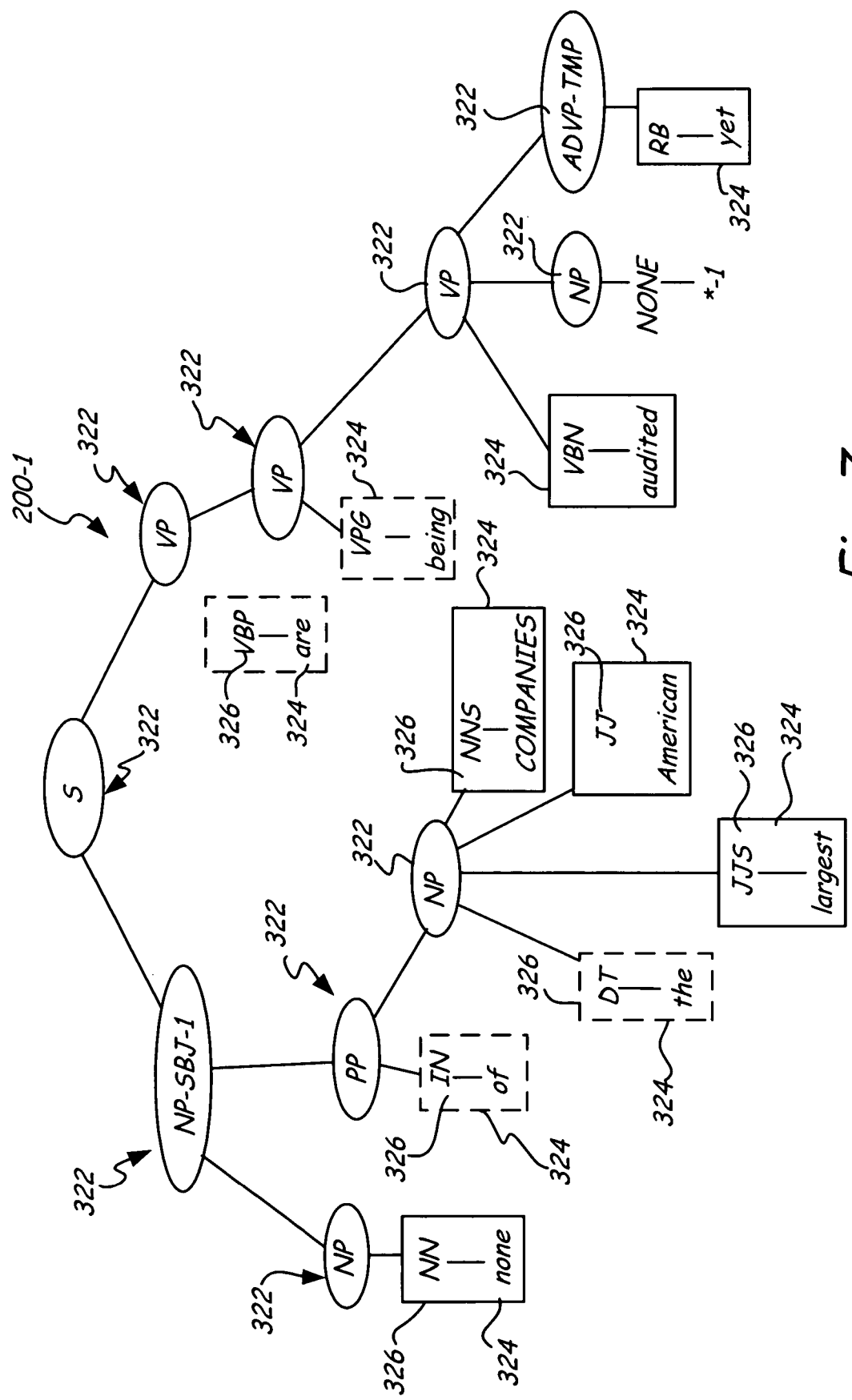
FIG. 7 illustrates an embodiment of a language particular syntax tree for the sentence "None of the largest American companies are being audited yet".

As shown in FIG. 6, typically, the language particular syntax tree 200 is stored as a bracketed text or data string 318. The bracketed text or data string 318 illustrated in FIG. 6 is for the English sentence "None of the largest American companies are being audited yet". The application uses the bracketed text or data string 318 and deserializes the data string to recover the constituent tree structure 200-1 as illustrated in FIG. 7 including phrasal or non-terminal nodes 322, terminal nodes 324 and grammatical tags or labels 326.

Analysis of the Language Particular Representation

As previously discussed and as illustrated by block 302, the method or module 300 performs an analysis of the language particular tree structure 200-1 to create the language neutral representation as follows.

a. Morphological Analysis of Terminal Nodes of the Language Particular Syntax

As schematically represented in FIG. 7, the analysis includes a morphological analysis of terminal nodes of the language particular tree structure 200-1 using grammatical tags 326 of the language particular tree structure 200-1. Terminal node word or elements of the language particular tree 200-1 are lemmatized to obtain the root word of each terminal node 324 and the attributes of the lemma or root word are assigned to provide a language neutral representation. In the embodiment illustrated in FIG. 7, the words or constituent elements of the noun phrase (NP) "the largest American companies" are converted to the root form of the words. For example, "largest" and "companies" are lemmatized to "large" plus attribute notation [+Supr +CompDimension] to note superlative and "company" plus attribute notation [+Plur] to note the plural form of the word.

The constituent elements or words of verb phrases (VP) are similarly lemmatized to provide the root form of the word for representation in LNS. Voice and other attributes of the constituent elements are preserved by the nodal attribute string or field 260; tense is preserved by tense node 257. In the illustrated embodiment, the verb phrase nodes for "are", "being" and "audited" are converted to a construction without auxiliary verbs. That is, it is represented by a main or base verb and the auxiliary verb form, tense or voice are represented by attributes fields or strings 260.

For example, the verb phrase "are being audited" is changed to "audit" plus a past tense node 257 and the notation [+Perf, +Prog] to represent the aspectual information in the language neutral syntax. Modal constructions with "to", such as "supposed to", "be going to" and "used to" are converted to auxiliary verb constructions and converted to a main or base verb and aspectual and voice attributes are used to represent tense, voice and other attributes as described.

b. Semantic Head Analysis of the Words and Constituents of the Language Particular Syntax The method or module 300 analyzes the semantic heads of constituents of the language particular syntax 200 to create the nodal and hierarchical structure of the language neutral representation. Constituent or phrasal heads are identified based upon Charniak head labeling rules or methodology as described in Charniak, E., "A Maximum-Entropy-Inspired Parser", In *Proceedings of NAACL* 2000 which is hereby incorporated by reference. The methodology employs an analysis using the phrasal nodes 322 and grammatical tags 326 of the language particular syntax 320.

In some cases, however, the semantic head of a constituent differs from the surface constituent head as identified by Charniak's rules. For example, for the language particular syntax, "None of the largest American Companies are being audited yet", the verb phrase "are being audited" is the syntactic head of the constituent sentence S and "none" is syntactic head of the phrasal node NP_SBJ-1 322, and "company" is the syntactic head of phrasal node NP following "of", and "yet" is the syntactic head of phrasal node ADVP-TMP.

Figure 8:
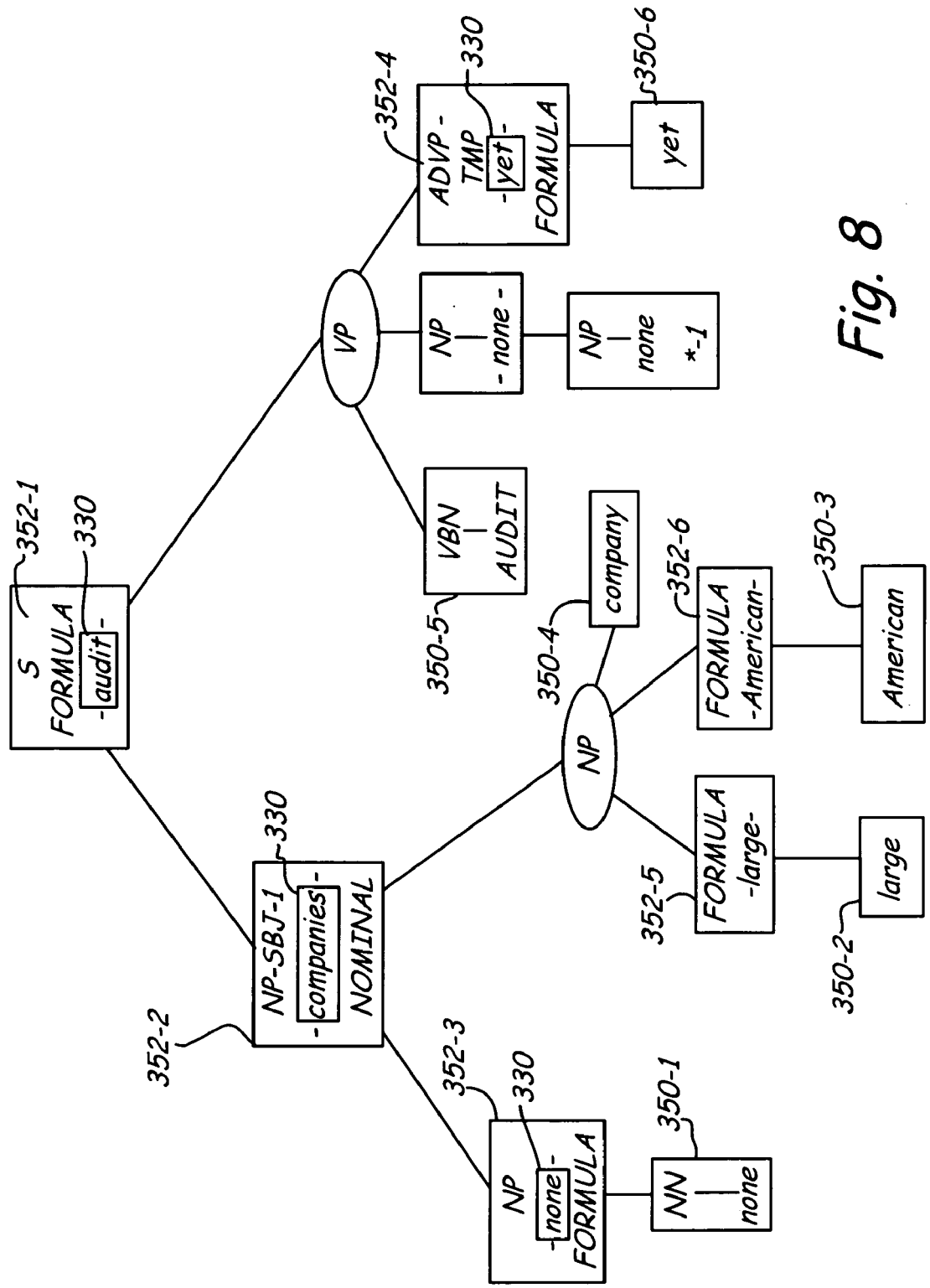
FIG. 8 illustrates head and phrasal nodes of the language particular syntax tree for creating nodes of the LNS representation.

Based upon a semantic analysis, the head of the phrase "None of the largest American companies" of phrasal node NP-SBJ-1 becomes "companies" to provide a semantic head structure represented by the language particular syntax 200-1. FIG. 8 illustrates heads 330 of phrasal nodes or non-terminal nodes of the language particular syntax 200-1.

Similarly, the verb phrase "are being audited yet", which contains auxiliary verbs "are" and "being", is analyzed so that the main verb "audited" is the semantic head, with the auxiliary verbs analyzed as premodifiers.

Similarly, the head of complex quantifier constructions, such as "a pair of pants" is changed to "pants" and "pair" is a quantifier of the head to provide a semantic based head structure in contrast to the surface syntax head structure. "S" is made the head of SBAR constituents as set forth in a Penn Treebank annotation.

c. Addition of Non-Terminal Nodes

Based upon the head analysis, terminal nodes having no corresponding phrasal node or that are not the semantic head of any phrasal node or constituent of the language particular tree 200-1 are identified. In particular, in the illustrated embodiment, "large" and "American" are not heads of any phrasal node or non-terminal node and have no head node relation as illustrated in FIG. 8. The analysis is used to create a hierarchical structure including a phrasal node for each terminal node that is not the head of any phrasal node and that corresponds to a node in the LNS tree, as will be described.

e. Analyze Compound and Coordinate Noun Phrase Constructions.

Certain compound nouns containing a multi-word proper noun, e.g. "New York money broker", where New York is a multi-word proper noun are assigned internal structure lacking in the original language particular tree structure 320. In this example, "New" and "York" are treated by the Penn Treebank annotation as being constituents of the whole NP e.g. (NP (NNP New) (NNP York) (NN money) (NN broker)), and the method or module 300 creates a new node in the tree containing the whole proper noun "New York". Internal structure or scope is assigned to coordinate noun structures such as coordinate structures including one or more phrases joined by one or more coordinating conjunctions such as "and" for use to create the hierarchical dependency structure as will be described.

d. Other Attributes of the Language Particular Syntax are Analyzed

Other attributes or features of the language particular tree 320 ate analyzed for the purpose of creating the language neutral syntax. For example tense, sentence mode and negation are analyzed for purpose of creating abstract nodes to represent sentence negation, tense and modal operators. Additionally, in a PTB representation, an empty unit node is replaced with a "$". Links between empty categories, (i.e. terminal nodes 324 with no corresponding string) and their antecedent are made and it-cleft and pseudo cleft constructions such as it-cleft "It was John that I talked to" and pseudo-cleft "John was who I talked to" and "Who I talked to was John" are identified to create a hierarchical nodal structure therefor.

Create LNS Nodes for the Language Neutral Syntax

Based upon the analysis of the language particular tree 200-1, the method or module 300 creates LNS nodes using the phrasal and terminal nodal structure of the language particular tree 200-1. For example, a LNS node (lemma, FORMULA or NOMINAL) is created for each terminal or phrasal node of the language particular tree 200-1 having a corresponding LNS node. In general, most nodes in the language particular tree have a corresponding LNS node; those that do not for a closed class of function words such as auxiliary verbs, definite and indefinite articles, and certain prepositions and complementizers. In the schematic representation of FIG. 8, the method or module 300 creates a lemma or terminal nodes 350-1, 350-2, 350-3, 350-4, 350-5, 350-6 corresponding to "none", "large", "american", "company", "audit" and "yet", respectively.

LNS does not create terminal nodes corresponding to "are" and "being" of the language particular syntax 200-1 since "are" and "being" form constituents of the auxiliary verb construction, and are language specific means of marking grammatical voice and aspect. The auxiliary verb construction "are being audited" is represented by the base form "audit" with an annotation to indicate voice and aspect [+Pass, +Prog +Perf].

LNS does not have a corresponding node for definite and indefinite articles such as "the" and "an" or "a" which are language specific means of marking definiteness and indefiniteness. Instead definiteness is preserved by nodal attribute 260 [+Def]; indefiniteness is indicated by the absence of this feature. In the illustrated example, "of" does not have a separate LNS node since it serves only to mark a noun phrase that is internal to another noun phrase.

Nonterminal LNS nodes 352-1, 352-2, 352-3, 352-4 are created corresponding to phrasal nodes of the language particular syntax tree 200-1 as illustrated in FIG. 8 based upon the head analysis. As previously described, each terminal node or constituent element has a corresponding head node in LNS. Based upon the head analysis, the semantic head of nonterminal node 352-1 is "audit", the semantic head of nonterminal node 352-2 is "company", the semantic head of nonterminal node 352-3 is "none" and the semantic head of the nonterminal node 352-4 corresponding to phrasal node ADVP-TMP is "yet". Semantic heads are assigned to the attribute SemHeads, as described in Table I.

Figures 1, 9:
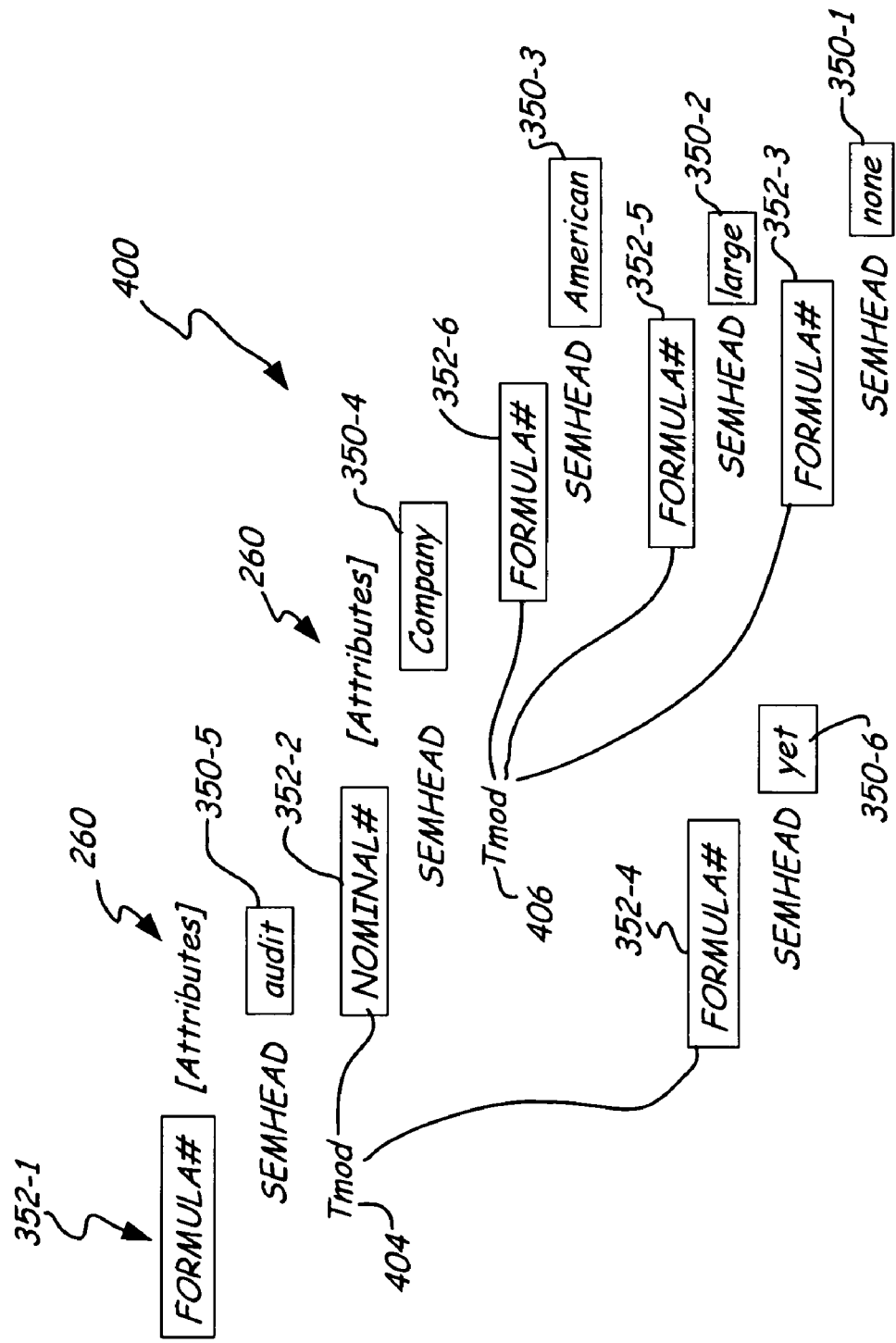
Figures 2, 9:
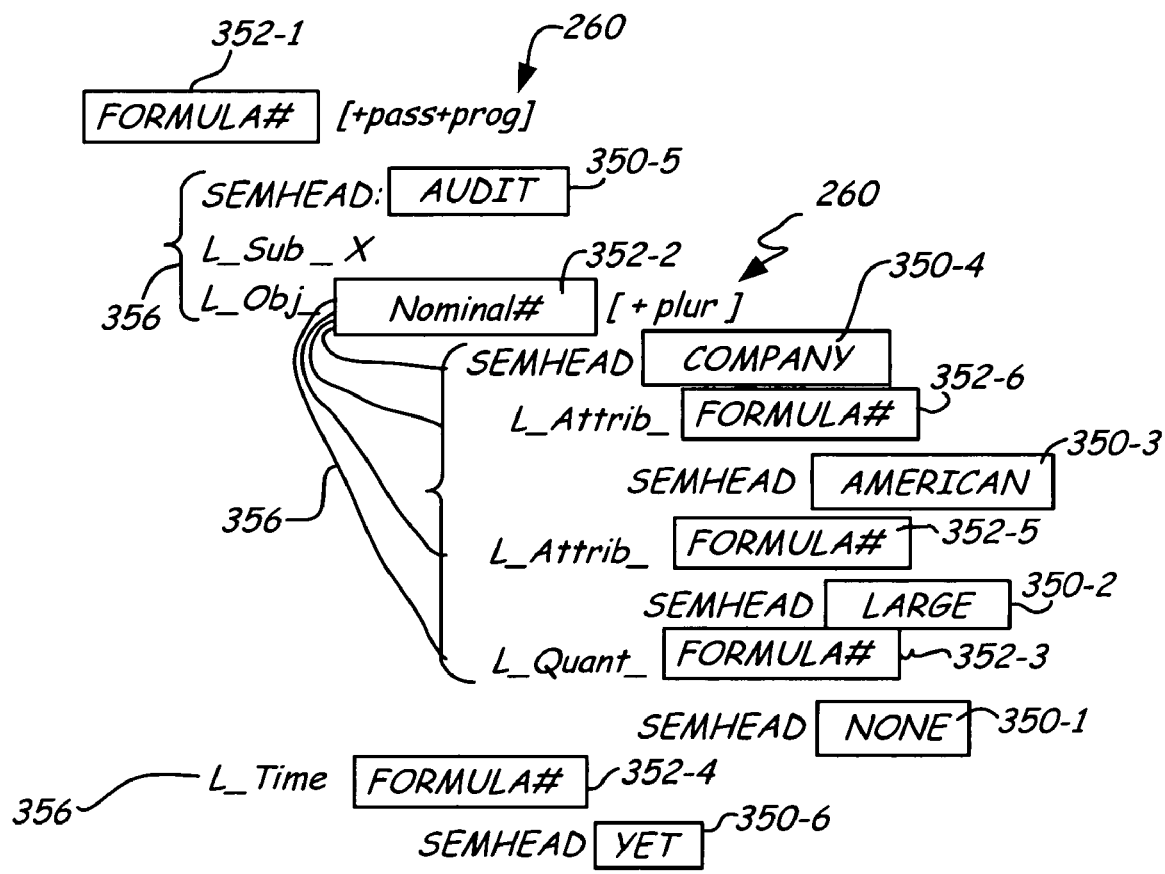
Figures 3, 9:
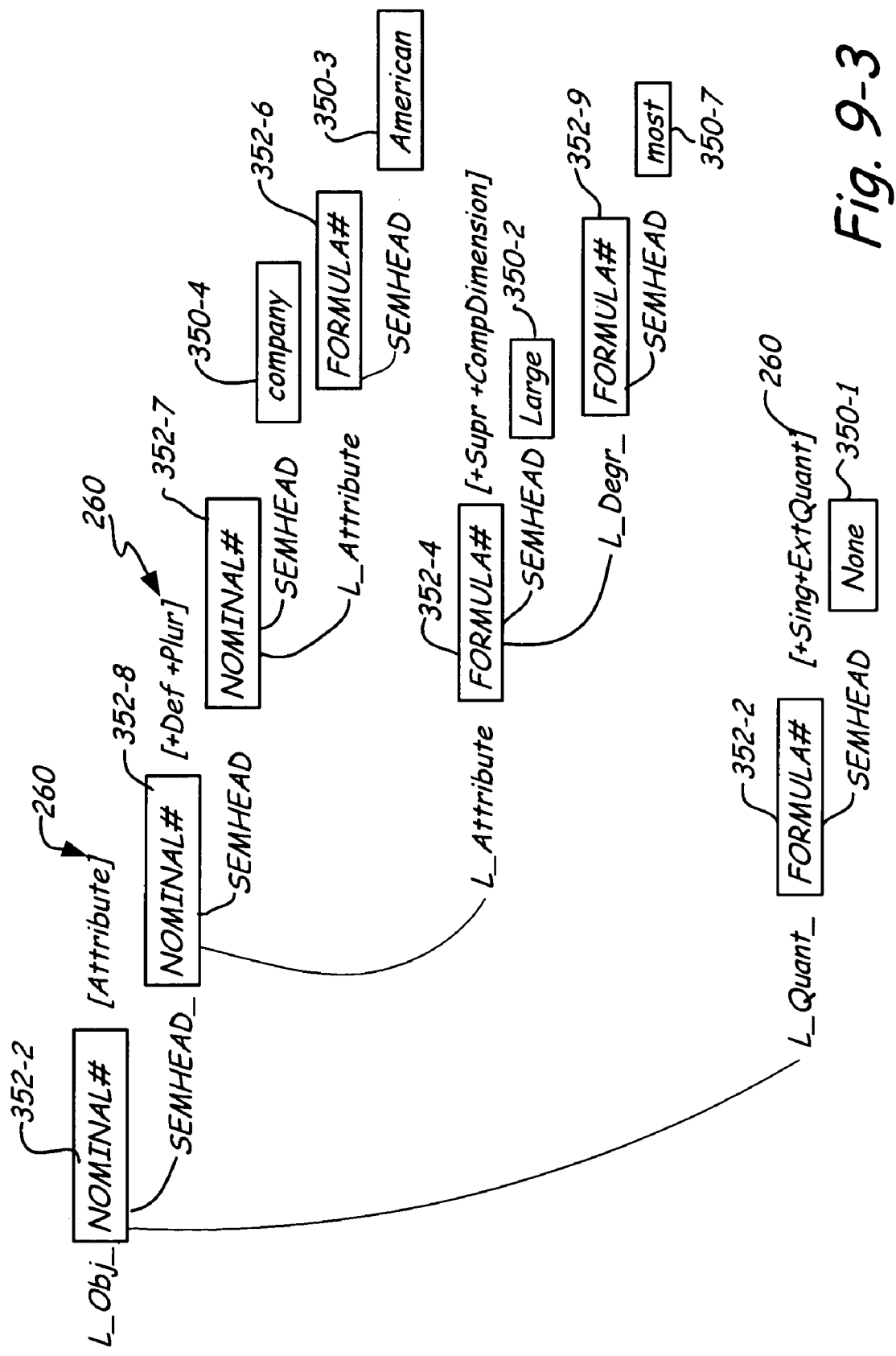
Figures 4, 9:
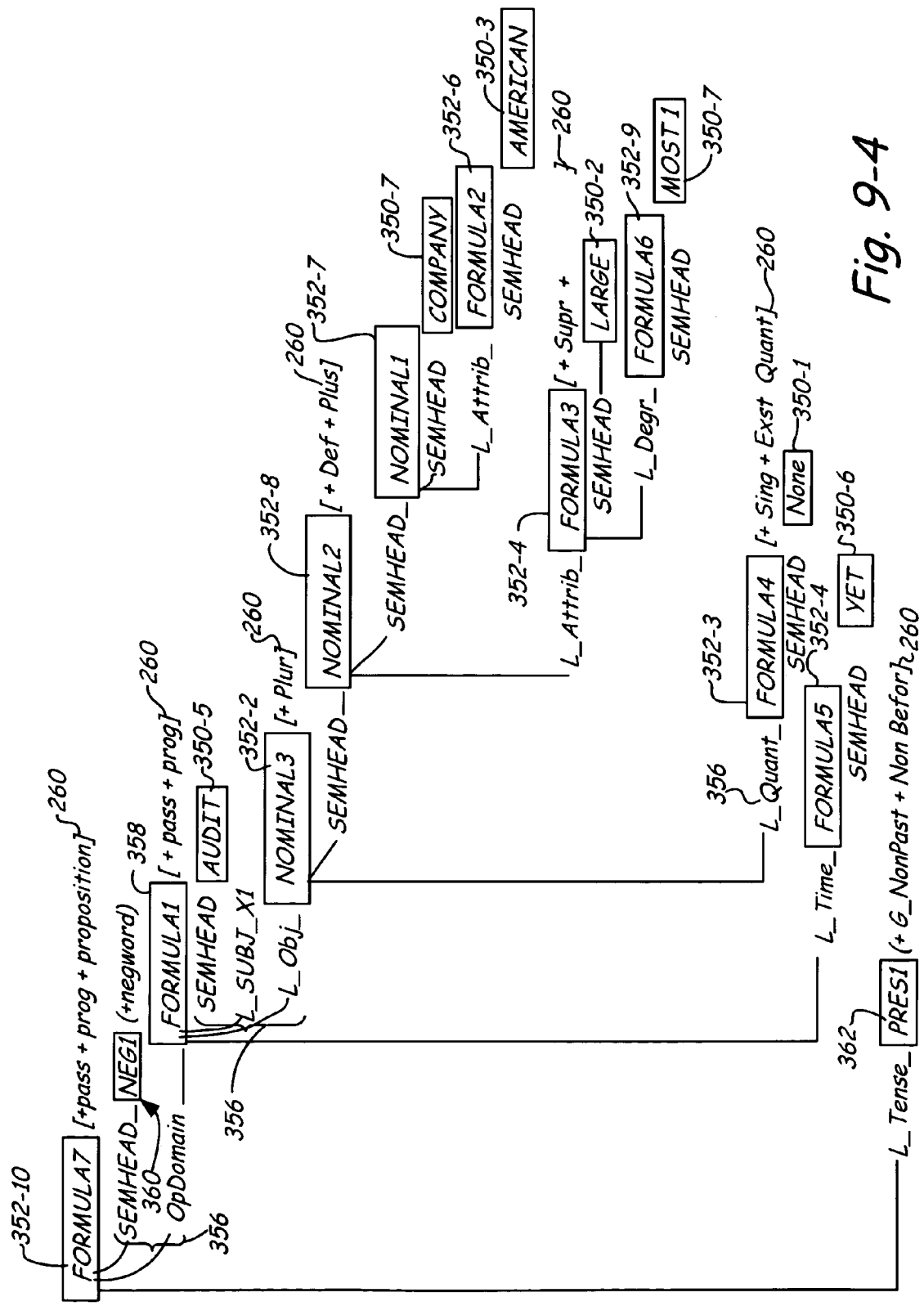

As previously described, LNS includes a phrasal node for each terminal node in the language particular tree that is represented in LNS. Thus, nonterminal nodes 352-5, 352-6 as illustrated in FIGS. 8 and 9-1 are created for "large" and "American".

In the illustrated example, nonterminal nodes in LNS are labeled NOMINAL or FORMULA. NOMINAL is used to refer to a nonterminal node which corresponds to a noun phrase and FORMULA is used to refer to a nonterminal node that does not correspond to a noun phrase. Terminal and nonterminal node labels in LNS include an integer index or other form of notation to distinguish the nodes from other nodes of the same type. The application also creates abstract nodes to represent certain grammatical attributes not represented in the language particular tree by a single word, such as tense, comparative or superlative, or negation, as will be described.

Create Hierarchical Dependency Structure for the LNS Nodes

As previously discussed the method or module 300 creates a hierarchical or nodal dependency structure to express grammatical function and scope for the LNS nodes. FIG. 9-1 through FIG. 9-4 illustrate an iterative sequence for creating the hierarchical dependency structure for the LNS nodes. As illustrated in FIG. 9-1, a preliminary dependency structure 400 is derived for each of the terminal and nonterminal nodes and grammatical relationships between terminal nodes and nonterminal nodes are assigned. The dependency structure is derived based upon the head structure, syntax and grammatical tags of the language particular tree 200.

a. Create a Preliminary Dependency Structure

In particular, as shown in FIG. 9-1, the terminal node 350-5 for "audit" is the semantic head [SemHeads] for the nonterminal node FORMULA#352-1 of the sentence. The preliminary dependency structure 400 includes temporary unlabeled dependencies, or Tmods, 404 for dependent constituents of node 352-1 or the sentence. The Tmods 404 includes nonterminal nodes 352-2 and 352-4 dependent from nonterminal node 352-1.

The semantic head of the nonterminal node 352-2 NOMINAL# is "company" which includes modifiers "American", "large" and "none" and the semantic head of nonterminal node 352-4 is "yet". The preliminary dependency structure also includes Tmods 406 for dependent nodes 352-3, 352-5, 352-6 corresponding to nonterminal node 352-2 for "none", "large" and "American" of the noun phrase "None of the largest American companies" of which "company" is the head.

As previously described, attributes of the head "audit" or "company" are passed or recorded by attribute bits or strings 260 on the corresponding nonterminal node. For example in the illustrated embodiment, based upon syntactical analysis of the lemmatized word, "audit", it is known that "audit" in the sentence includes an auxiliary verb construction and is past tense which is noted by attributes 260 as previously described. Nonterminal node NOMINAL#352-2 corresponding to the noun phrase "None of the largest American companies" is annotated with [+Def, +Plur] to note the inclusion of the definite article "the" in the NP corresponding to "none of the largest American companies" and to note the plural form of the word "company".

As previously described, grammatical and/or semantic relationships between nonterminal nodes and dependent nodes is recorded using semantic arc labels 256 as set forth in Table I. The semantic relations between the nodes is derived based upon the hierarchical head analysis and grammatical tags of the language particular tree. As shown in the illustrated embodiment of FIG. 9-2, the semantic relation between the semantic head "audit" of the nonterminal node FORMULA#352-1 and dependent nodes, for example dependent node 352-2 for the noun phrase "None of the largest American companies" is derived based upon constituents or grammatical tags of the language particular tree.

In particular, based upon representations in the language particular syntax, it is derived that the sentence is passive since there is a VBN whose corresponding verb phrase is preceded by a form of the verb "be", and which is followed by an empty category NP whose head is * and is coindexed with the subject NP-SBJ. Thus semantically the NOMINAL or nonterminal node 352-2 is actually the logical object L_Obj of the sentence and the subject of the sentence is not directly expressed.

Thus, in the iterative dependency structure illustrated in FIG. 9-2, Tmods 404 are replaced with labeled arcs 356. In particular, the L_Sub of the nonterminal node FORMULA#352-1 is a dummy variable expressed by "_X" and the dependent node 352-2 corresponding to the noun phrase "none of the largest American companies" is linked to the nonterminal node 352-1 via arc label L_Obj. "Yet" provides a logical time relation, indicated by the lable ADVP-TMP in the language particular tree, and its arc 356 is therefore labeled L_Time.

Additionally, Tmods 406 are replaced with labeled arcs 356 connecting the dependent nodes 352-3, 352-5, 352-6 to the nonterminal node 352-2. In particular, the labeled arcs 356 indicate that "none" is a logical quantifier L_Quant for the NOMINAL whose SemHeads is "company" and the nonterminal nodes whose SemHeads are "American" and "large" are logical attributes L_Attrib of the SemHeads "company" as illustrated in FIG. 9-2.

b. Insertion of Abstract Nodes

As previously described, abstract nodes that do not correspond to individual words or phrases in the original sentence are inserted in the LNS. In the illustrated example, there are four such insertions. The abstract node "_X" is inserted as the logical subject L_Sub of the sentence to indicate that the logical subject of "audit" is unspecified. The abstract node "_MOST" 350-7 is inserted as the degree modifier L_Degr of the phrase headed by "large", indicating that it is a superlative construction, derived from the word "largest" in the original sentence. The abstract node "_NEG" 360 is inserted as a dependent of the sentence to indicate that sentence is negated, though there is no separate negative word in the original sentence. Instead, negation in the original sentence is expressed by the word "None", which also acts as a quantifier. The abstract node _PRES, 362 indicating present tense is inserted as the logical tense L_Tense of the sentence, as described in more detail below.

c. Assign Scope to Create Hierarchical Nodal Structures for Noun Phrases.

Additionally scope is assigned to the logical attributes of noun phrases based upon linear order and modifier type using grammatical tags or labels. For example, quantifiers and quantifier-like adjectives are assigned wider scope than comparatives and superlatives which in turn are assigned wider scope than plain adjectives. Post-modifiers, such as English relative clauses are typically assigned wider scope than simple premodifying adjectives as follows.

Observations which have motivated one technique for assigning modifier scope are set out in greater detail in a publication entitled Campbell, Richard, COMPUTATION OF MODIFIER SCOPE IN NP BY A LANGUAGE-NEUTRAL METHOD, *In Proceedings of COLING* 2002, Taipei. In one embodiment, the modifiers are placed into one of three categories including nonrestrictive modifiers, quantifiers and quantifier-like adjectives, and other modifiers. For example, nonrestrictive modifiers include postnominal relative clauses, adjective phrases and participial clauses that have some structural indication of their non-restrictiveness, such as being preceded by a comma. Quantifier-like adjectives include comparatives, superlatives, ordinals, and modifiers (such as "only") that are marked in the dictionary as being able to occur before a determiner. Also, if a quantifier-like adjective is prenominal, then any other adjective that precedes it is treated as if it Were quantifier-like. If the quantifier-like adjective is postnominal, then any other adjective that follows it is treated as if quantifier-like.

Finally, modifier scope is assigned according to a set of derived scope rules.

Table IV illustrates one set of modifier scope rules that are applied to assign modifier scope.

TABLE IV

I. Computation of modifier scope 1. nonrestrictive modifiers have wider scope than all other groups;
2. quantifiers and quantifier-like adjectives have wider scope than other modifiers not covered in (1);
3. within each group, assign wider scope to postnominal modifiers over prenominal modifiers;
4. among postnominal modifiers in the same group, or among prenominal modifiers in the same group, assign wider scope to modifiers farther from the head noun.

It was also found that because of lexical characteristics of certain languages, the scope assignment rules can be modified to obtain better performance. One such modification modifies the scope assignment algorithm that treats syntactically simple (unmodified) postnominal modifiers as a special case, getting assigned narrower scope than regular prenominal modifiers. This is set out in the scope assignment rules of Table V.

TABLE V

II. Computation of modifier scope 1. nonrestrictive modifiers have wider scope than all other groups;
2. quantifiers and quantifier-like adjectives have wider scope than other modifiers not covered in (II.1);
3. syntactically complex postnominal modifiers that are not relative clauses have wider scope than other modifiers not covered by (II.1-2);
4. prenominal modifiers not covered by (II.1-3) have wider scope than other modifiers not covered by (II.1-3);
5. otherwise, within each group, assign wider scope to postnominal modifiers over prenominal modifiers;
6. among postnominal modifiers in the same group, or among prenominal modifiers in the same group, assign wider scope to modifiers farther from the head noun.

The difference between these scope assignments rules and those found in Table IV lies in steps 3 and 4 in Table V. These steps ensure that syntactically complex postnominal modifiers have wider scope than non-quantificational prenominal modifiers, and that prenominal modifiers have wider scope than syntactically simple postnominal modifiers. Implementing the rules set out in Table 5 has been observed to significantly reduce the number of French and Spanish errors in one example set.

In applying these rules, it may be desirable for quantifiers to be distinguished from adjectives, adjectives to be identified as superlative, comparative, ordinal or as able to occur before a determiner, and postnominal modifiers to be marked as non-restrictive. However, even in languages where the third requirement is not easily met, the scope assignment rules work relatively well.

Thus, based upon scope analysis, a hierarchical nodal structure is created for the noun phrase "none of the largest American companies" as illustrated in FIG. 9-3. "American" is an attributive modifier of "company" and thus a nonterminal node 352-7 is created to express dependency and scope of "American" relative to the semantic head "company" of the nonterminal node 352-7. As shown, dependent node 352-6 headed by "American" is labeled as the L_Attrib of nonterminal node 352-7 to express the relation of "American" to the semantic head "company" of the nonterminal node 352-7.

"Large" modifies "American company" and thus nonterminal node 352-8 is created to provide a nodal dependency structure relative to dependent node 352-7 for "American company" to represent logical scope of "large" relative to "American company". As shown the dependent node 352-4 headed by "large" is labeled an L-Attrib of nonterminal node 352-8 to represent logical scope of "large" relative to the semantic head "American company" of nonterminal node 358-8.

As shown, "largest" in the noun phrase is represented by lemma "large" which is SemHeads of nonterminal node FORMULA#352-4. "Large" is a superlative and is represented by attribute labels (+Supr, +CompDimension). As shown, the superlative relation of "large" is expressed by a dependent node FORMULA#352-9 having a semantic head "_MOST" and relation label L-Degr to nonterminal node 352-4 for the semantic head "large", as previously described. Based upon the analysis, "none" has scope over "largest American companies" which is represented by the relation of dependent node 352-3 for "none" and nonterminal node 352-2. As shown, dependent node 352-3 is related to the nonterminal node 352-2 having a semantic head dependency structure for "largest American companies" by a labeled arc L_Quant as shown in FIG. 9-3.

d. Assign Scope to Sentence- and Clause-Level Operators

Sentence level logical operators including sentential negation and modality operators are typically assigned scope within their clause based upon linear order with the exception that negation has scope over the modal in the sequence "can not". In the illustrated embodiment the negative operator "_NEG" is created to represent the negation of the proposition that some of the largest American companies are being audited, as described above. The negative mode of the sentence is represented by an abstract nonterminal node FORMULA#352-10 and the negative operator or node 360 becomes the SemHeads and the node 358 becomes the OpDomain of the nonterminal node 352-10 as illustrated in FIG. 9-4.

e. Assign Language Neutral Tense

Each tensed clause of a sentence or constituency contains one or more tense nodes in a distinct relation (such as the L_tense or "logical tense" relation) with the clause. A tense node is specified with semantic tense features, representing the meaning of each particular tense, and attributes indicating its relation to other nodes (including other tense nodes) in the LNS representation. In the illustrated embodiment, the tense of the sentence is represented by an abstract tense node _

PRES 362, connected to the clausal node by labeled arc L_Tense and specified by nodal attributes +G_NonPast, +NonBefor as illustrated in FIG. 9-4.

Table 6 illustrates the basic global tense features, along with their interpretations, and Table 7 illustrates the basic anchorable features, along with their interpretations. The "U" stands for the utterance time, or speech time.

TABLE 6

| Feature | Meaning |
| --- | --- |
| G_Past | before U |
| G_NonPast | not before U |
| G_Future | After U |

TABLE 7

| Feature | Meaning |
| --- | --- |
| Befor | before Anchr if there is one; otherwise before U |
| NonBefor | not before Anchr if there is one; otherwise not before U |
| Aftr | After Anchr if there is one; otherwise after U |
| NonAftr | not after Anchr if there is one; otherwise not after U |

The tense features of a given tense node are determined on a language-particular basis according to the interpretation of individual grammatical tenses. For example, the simple past tense in English is [+G_Past], and the simple present tense is [+G_NonPast] [+NonBefor], etc. Of course, additional features can be added as well. Many languages make a grammatical distinction between immediate future and general future tense, or between recent past and remote or general past. The present framework is flexible enough to accommodate tense features, as necessary. A full discussion of analyzing this phenomena is set out in Campbell et al., A LANGUAGE-NEUTRAL REPRESENTATION OF TEMPORAL INFORMATION, In LREC 2002 Workshop Proceedings: Annotation Standards for Temporal Information in Natural Language, pp 13-21, (2002).

Uses of Language Neutral Syntax

LNS provides a semantically motivated representation which serves as a representation from which other application-specific semantic representation can be derived. One example of a semantic representation that can be derived from the LNS is a Predicate-Argument Structure (PAS). Other applications make use of other representations derived from LNS including bilingual collocations, multi-document summarizations, automatic quiz generation, sentence classification and document classification. The present invention provides a LNS from a language particular syntax or Penn Treebank which has advantages for producing LNS and predicate-argument structures derived therefrom for use by different applications.

Although the present invention has been described with reference to particular embodiments, workers skilled in the art will recognize that changes may be made in form and detail without departing from the spirit and scope of the invention.

What is claimed is:

1. A system including computer executable instructions on a computer storage media and the computer executable instructions being executed by a processing unit to implement one or more components comprising:
   a node generator configured to receive a parsed natural language sentence or phrase and recover phrasal and constituent nodes and grammatical tags for the phrasal and constituent nodes of the parsed natural language sentence or phrase and the node generator uses a head analysis component to analyze the phrasal and constituent nodes and grammatical tags of the parsed natural language sentence or phrase to generate hierarchical and dependent nodes of a language neutral representation of the parsed natural language sentence or phrase; and
   a node dependency generator configured to receive the hierarchical and dependent nodes and the grammatical tags of the parsed natural language sentence and create an iterative dependency structure including a preliminary dependency structure including one or more unlabeled dependencies to one or more semantic heads and a secondary dependency structure including semantic or grammatical labels replacing the one or more unlabeled dependencies to generate an unordered hierarchical dependency structure for the hierarchical and dependent nodes and the semantic or grammatical labels representing a language neutral relation between the hierarchical and dependent nodes different from the grammatical tags of the parsed natural language sentence or phrase using a semantic relation between the hierarchical and dependent nodes derived from the grammatical tags of the parsed natural language sentence or phrase.

2. The system of claim 1 wherein the node generator uses a morphological analysis component to analyze the phrasal and constituent nodes and the grammatical tags of the parsed natural language sentence or phrase to generate the hierarchical and dependent nodes.

3. The system of claim 1 wherein the node generator creates a head node for each of the phrasal nodes of the parsed natural language sentence or phrase.

4. The system of claim 1 wherein the node generator derives a base form of a word or element for one or more constituent nodes of the parsed natural language sentence or phrase and one or more corresponding grammatical features or attributes of the base form are represented in one or more hierarchical or head nodes of the unordered hierarchical dependency structure corresponding to one or more dependent nodes for the one or more constituent nodes.

5. The system of claim 1 wherein the node generator provides a node derivation for an auxiliary or complex verb construction including a main verb and aspectual and voice features.

6. The system of claim 1 wherein the node generator provides a derivation to represent scope and logical relation of constituents of a compound and coordinating noun phrase in the unordered hierarchical dependency structure.

7. The system of claim 1 wherein the node dependency generator is configured to create the unordered hierarchical dependency structure to represent logical scope and relation of constituents of a noun phrase or verb phrase using the grammatical tags and syntax of the parsed natural language sentence or phase and scope assignment criteria.

8. The system of claim 1 wherein the node dependency generator creates abstract nodes to represent tense, comparison, superlative, negation, and unspecified arguments not represented by individual words or phrases in the parsed natural language sentence or phrase.

9. The system of claim 1 wherein the parsed natural language sentence or phrase is a Penn Treebank annotation.

10. A method for creating an unordered hierarchical dependency structure to represent a natural language sentence or phrase comprising computer executable instructions on a computer storage media and executable by a processing unit to implement the steps comprising:
    receiving a parsed natural language sentence or phrase;
    recovering phrasal and constituent nodes and grammatical tags of the parsed natural language sentence or phrase;
    deriving hierarchical and dependent nodes using the phrasal and constituent nodes of the parsed natural language sentence or phrase;
    creating a preliminary dependency structure including one or more temporary dependencies to one or more hierarchical nodes using the grammatical tags of the parsed natural language sentence or phrase; and
    replacing the one or more temporary dependencies with semantic or grammatical labels representing logical relation between one or more dependent nodes and the one or more hierarchical nodes and creating an unordered hierarchical dependency structure for the hierarchical and dependent nodes where the semantic or grammatical labels represent a language neutral relation between the hierarchical and dependent nodes different from the grammatical tags of the parsed natural language sentence or phrase.

11. The method of claim 10 wherein the step of creating the unordered hierarchical dependency structure comprises:
    lemmatizing constituents of terminal nodes of the unordered hierarchical dependency structure and assigning attributes to a nonterminal node corresponding to the terminal node for the lemmatized constituent to provide a language neutral representation.

12. The method of claim 10 and further comprising the step of:
    performing a head analysis of the parsed natural language sentence or phrase; and
    creating the unordered hierarchical dependency structure based upon a semantic relation between constituents of the parsed natural language sentence or phrase derived using the head analysis.

13. The method of claim 12 wherein hierarchical head nodes are created for one or more of the constituent nodes of the parsed natural language sentence or phrase based upon the head analysis.

14. The method of claim 10 and further comprising the step of:
    creating abstract nodes for the unordered hierarchical dependency structure to represent negation, tense or modal operator.

15. The method of claim 10 and further comprising the step of:
    performing a scope analysis to create the unordered hierarchical dependency structure to represent logical and grammatical relation of constituents of a noun or verb phrase.

16. The method of claim 10 wherein the parsed natural language sentence or phrase is a data string and comprising:
    deserializing the data string to recover the phrasal and constituent nodes and the grammatical tags of parsed natural language sentence or phrase.

17. The method of claim 10 and comprising:
    parsing the natural language sentence to provide the phrasal and constituent nodes for the natural language sentence or phrase and the grammatical tags for the phrasal and constituent nodes.

* * * * *